(12) United States Patent
Omori et al.

(10) Patent No.: US 10,081,951 B2
(45) Date of Patent: Sep. 25, 2018

(54) STORAGE STRUCTURE

(71) Applicant: Daifuku Co., Ltd., Osaka-shi (JP)

(72) Inventors: Kazuya Omori, Hinocho (JP); Takeshi Abe, Hinocho (JP)

(73) Assignee: Daifuku Co., Ltd., Osaka-shi (JP)

( * ) Notice: Subject to any disclaimer, the term of this patent is extended or adjusted under 35 U.S.C. 154(b) by 0 days.

(21) Appl. No.: 15/348,259

(22) Filed: Nov. 10, 2016

(65) Prior Publication Data

US 2017/0138059 A1 May 18, 2017

(30) Foreign Application Priority Data

Nov. 12, 2015 (JP) ................... 2015-222209

(51) Int. Cl.
| | |
|---|---|
| *E04F 13/12* | (2006.01) |
| *E04F 13/08* | (2006.01) |
| *E04B 1/24* | (2006.01) |
| *E04H 5/02* | (2006.01) |
| *E04H 15/62* | (2006.01) |
| *B65G 1/04* | (2006.01) |
| *B65G 1/02* | (2006.01) |

(52) U.S. Cl.
CPC .............. *E04F 13/086* (2013.01); *E04B 1/24* (2013.01); *E04F 13/12* (2013.01); *E04H 5/02* (2013.01); *E04H 15/62* (2013.01); *B65G 1/02* (2013.01); *B65G 1/0407* (2013.01); *E04B 2001/2481* (2013.01)

(58) Field of Classification Search
CPC ........... B65G 1/04; B65G 1/0407; E04B 1/24; A47B 57/08; A47B 57/10; A47B 57/18; A47B 57/20

USPC .................................................. 211/187, 190
See application file for complete search history.

(56) References Cited

U.S. PATENT DOCUMENTS

| | | | | |
|---|---|---|---|---|
| 5,158,347 A | * | 10/1992 | Warren ............. | E05L 317/0029 312/319.8 |
| 5,211,296 A | * | 5/1993 | D'Heygere ............ | B65G 1/026 211/1.57 |
| 5,690,239 A | * | 11/1997 | Ballard ..................... | A47F 5/04 211/187 |
| 6,193,085 B1 | * | 2/2001 | Nook ...................... | A47F 1/126 211/187 |
| 8,672,150 B2 | * | 3/2014 | Chen ..................... | A47B 57/50 107/147.16 |
| 9,056,718 B2 | * | 6/2015 | Ito ........................ | B65G 1/0407 |

(Continued)

FOREIGN PATENT DOCUMENTS

JP 2003171004 A 6/2003

*Primary Examiner* — Paola Agudelo
(74) *Attorney, Agent, or Firm* — The Webb Law Firm

(57) ABSTRACT

A storage structure is provided in which an outside surface panel can be attached and removed regardless of where the storage structure is installed. The storage structure has a plurality of columns, an outside surface panel configured to be located between two mutually adjacent columns to form a part of an outer wall, and an outward-side pressing member and an inward-side pressing member each of which can be removably attached to a column. The outside surface panel has a width which is less than a distance between the two mutually adjacent columns. The outward-side pressing member and the inward-side pressing member cooperate with each other to assist in holding the outside surface panel from both sides.

3 Claims, 10 Drawing Sheets

(56) References Cited

U.S. PATENT DOCUMENTS

| | | | |
|---|---|---|---|
| 2006/0261025 A1* | 11/2006 | Heyderman | A47B 57/20 211/187 |
| 2007/0023376 A1* | 2/2007 | Black | A47B 47/025 211/187 |
| 2016/0001976 A1* | 1/2016 | Nagamine | B65G 1/02 211/71.01 |
| 2016/0167879 A1* | 6/2016 | Masuda | B65G 1/0421 414/274 |
| 2016/0244260 A1* | 8/2016 | Oshikawa | B65G 1/0407 |
| 2016/0264356 A1* | 9/2016 | Wakizaka | B65G 1/06 |

* cited by examiner

STORAGE STRUCTURE

CROSS-REFERENCE TO RELATED APPLICATION

This application claims priority to Japanese Patent Application No. 2015-222209 filed Nov. 12, 2015, the disclosure of which is hereby incorporated in its entirety by reference.

FIELD OF THE INVENTION

The present invention relates to a storage structure for storing articles.

BACKGROUND

In a manufacturing process of industrial products, for example, storage structures are used to temporarily store raw materials, intermediate products, etc. while they wait for the next process, etc., or to store finished products. An example of such storage structure is disclosed in JP Publication of Application No. 2003-171004 (the reference numerals in brackets in the present background section are those used in this reference). This storage structure has a plurality of columns (column members (21)), and outside surface panels (external wall panels (23)) each located to extend between two mutually adjacent columns to form outer walls. In this storage structure, each outside surface panel is held between columns and outward-side pressing members attached to the columns (pressing members (18) and slot engaging members (19)) and is fixed on the outer side of the columns (see FIG. 13 of the reference.)

However, because of how the outside surface panels are fixed, the installing and removal of the outside surface panels have to be performed outside the storage structure. This made it impossible to remove outside surface panels once the storage structure was installed depending on the location in which the storage structure was installed. For example, when an additional component needs to be installed inside the storage structure, it is sometimes convenient to temporarily remove an outside surface panel in order to make that installation work possible and/or efficient. However, if the storage structure is installed close to an external structure, no work space would be available between such external structure and the storage structure, which makes it practically impossible to perform work from the outside of the storage structure and thus to remove the outside surface panel.

SUMMARY OF THE INVENTION

In view of the above, a storage structure is desired in which outside surface panels can be installed and removed regardless of where the storage structure is installed.

One embodiment of a storage structure for storing articles and having outer walls in side periphery thereof comprises a plurality of columns spaced apart from each other along a spaced-apart direction, an outside surface panel configured to be located between two mutually adjacent columns to form a part of an outer wall, an outward-side pressing member configured to be removably attached to a first target surface of a column, the first target surface being an outward side surface of the column, and an inward-side pressing member configured to be removably attached to a second target surface of the column, the second target surface extending at an angle with the first target surface, wherein the outside surface panel has a panel width which is less than an inter-column separation distance which is a dimension, along the spaced-apart direction, of a space formed between the two mutually adjacent columns, and wherein the outward-side pressing member and the inward-side pressing member configured to cooperate with each other to assist in holding the outside surface panel from both sides thereof.

With the arrangement described above, by removing either one or more of such outward-side pressing member or one or more of such inward-side pressing member which cooperate with each other to assist in holding the outside surface panel from both sides, the outside surface panel can be removed from either the inward side or outward side of the storage structure. Conversely, the outside surface panel can be attached from either the outward side or inward side of the storage structure by installing the outside surface panel with either the one or more of such outward-side pressing member or the one or more of such inward-side pressing member already attached to the column and by subsequently attaching the other of the one or more of such outward-side pressing member and the one or more of inward-side pressing member to the column. Therefore, when sufficient space is available outside the storage structure, the outside surface panel can be attached and removed from either the inward side or outward side of the storage structure. And even when such sufficient space is not available outside the storage structure, the outside surface panel can be attached and removed from the inward side of the storage structure. Thus, in the storage structure having this arrangement, an outside surface panel can be attached and removed regardless of where the storage structure is installed.

Additional features and advantages of the storage structure will be further clarified by the following description of exemplary and non-limiting embodiments described with reference to the attached drawings.

DETAILED DESCRIPTION OF EMBODIMENTS

Embodiments of the storage structure are described next. In the present embodiment, a storage structure 1, provided to a storage facility 100 for storing containers C each for holding articles or objects within, is described as an example. The storage structure 1 of the present embodiment is used to temporarily store raw materials, intermediate products, etc. while they wait for the next process, etc., or to store finished products in, for example, a manufacturing process of industrial products. The storage structure 1 of the present embodiment is described in detail next.

Note that, in the following description, each of the direction of height (or simply height direction) H, the lateral width direction W, and the fore and aft direction D of the storage structure 1 is defined as that as seen by a person facing the rack 2 in question which is provided to the storage structure 1. In other words, the height direction H coincides with the vertical direction, the lateral width direction W coincides with the right-and-left direction, and the fore and aft direction D coincides with the direction of depth (depth direction) of the rack. In addition, from a view point of a person facing the rack 2, the deeper end side along the fore and aft direction D may sometimes be referred to as the "back side" and the closer side may sometimes be referred to as the "front side". When a reference is made of a direction in a description about any given component member, the direction should be understood to refer to a direction normally defined for a storage structure 1 that is assembled in an appropriate manner, unless explicitly stated otherwise.

In addition, in the following description, the expression "along" used in conjunction with a certain direction is a concept that includes not only the direction parallel to that certain direction but also any direction that is slightly tilted (for example, by an angle of less than 10 degrees) from that certain direction and should be interpreted as such. In addition, terms and expressions describing a direction, or a dimension, etc. (e.g., "perpendicular", "uniform", or "same", etc.) in the following description are concepts that allow for variations (permissible variations in manufacturing, installing or assembling process) and should be interpreted as such.

Figure 1:
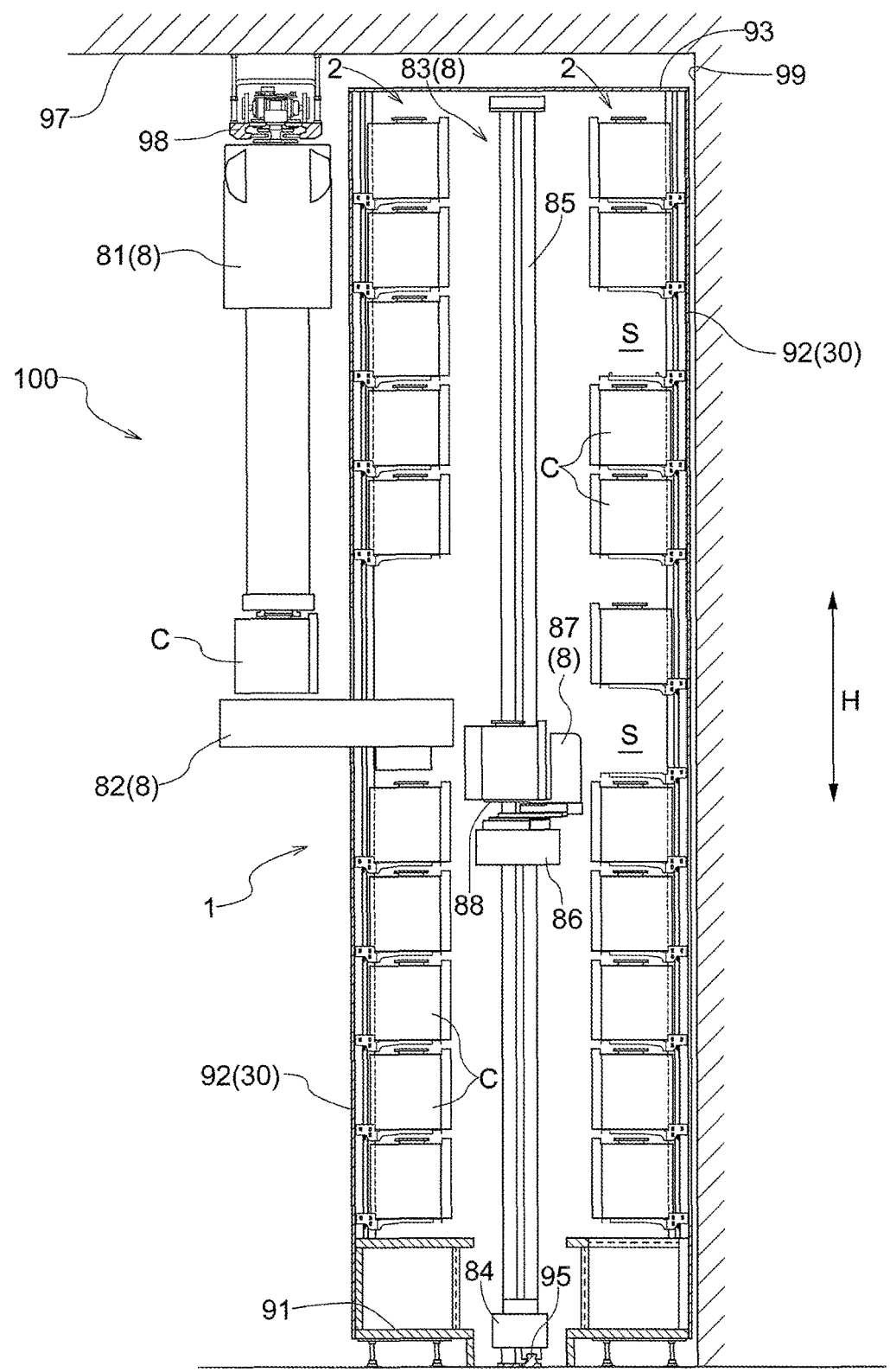
FIG. 1 is a side view of a storage facility including a storage structure in accordance with an embodiment.

As shown in FIG. 1, the storage facility 100 includes the storage structure 1 for storing containers C for holding articles, and a transporting portion 8 for transporting containers C, one at a time, to or from the storage structure 1. A front opening type box-shaped container, for example, may be used as the container C. The storage structure 1 of the present embodiment is surrounded by a floor portion 91, peripheral wall portions 92 provided in the side periphery, and a ceiling portion 93. In the present embodiment, a peripheral wall portion 92 is, or correspond to, an "outer wall". An entrance is formed in a peripheral wall portion 92 (not shown). This entrance is provided so that a worker can enter the storage structure 1 when necessary. A door which can be opened and closed is installed to the entrance and is closed during the normal use of the storage structure 1.

The transporting portion 8 includes, as its principal components, a first transport device 81, a moving device 82, a second transport device 83, and a transfer device 87. The first transport device 81 is provided outside the storage structure 1. The moving device 82 is provided and is arranged to extend through a peripheral wall portion 92. And the second transport device 83 and the transfer device 87 are provided inside the storage structure 1.

The first transport device 81 is, for example, a hoist-type transport vehicle. The first transport device 81 travels along guide rails 98 installed to the ceiling 97 of the facility in which the storage facility 100 is installed. The first transport device 81 carries a container C to and from the moving device 82 with the first transport device 81 gripping or holding a flange portion provided to the container C.

The moving device 82 is a conveyor, such as a roller type or a belt type conveyor, for example. The moving device 82 moves containers C between a location inside the storage structure 1 and a location outside the storage structure 1.

The second transport device 83 is, for example, a stacker crane. The second transport device 83 has a travel carriage 84 configured to travel along a travel rail 95 installed on the floor portion 91 of the storage structure 1, a mast 85 arranged vertically on the travel carriage 84, and a vertically movable platform 86 which is vertically moved while being guided by the mast 85. A transfer device 87 configured to transfer a container C to or from any one of the storage sections S is provided to the vertically movable platform 86. The transfer device 87 has a plate-shaped support member 88 (a member generally formed in a shape of a plate (thin material)) for supporting a container C from below. The support member 88 is configured to be projected to a projected position in which the support member 88 is inside a storage section S and to be retracted to a retracted position in which the support member 88 has been retracted toward the vertically movable platform 86. The second transport device 83 equipped with the transfer device 87 performs an unloading operation to, and a pick-up operation from, any one of the storage sections S and the moving device 82 to thus performs transfer operations to and from these locations. The unloading operation is an operation for unloading or delivering a container C by means of the transfer device 87 whereas the pick-up operation is an operation for picking up a container C by means of the transfer device 87 to receive the container C.

The first transport device 81, the moving device 82, the second transport device 83, and the transfer device 87 cooperate with each other to perform carry-in operations for carrying in (storing) containers C into the storage sections S, one container C at a time. In addition, the first transport device 81, the moving device 82, the second transport device 83, and the transfer device 87 cooperate with each other to perform carry-out operations for carrying out (or taking out or retrieving) containers C from the storage sections S, one container C at a time. These operations are controlled by a controller based on information on detection results from various sensors provided at various locations in the storage facility 100.

The storage structure 1 has two racks 2 that form a pair in the present embodiment. The pair of two racks 2 are installed such that they face each other with the second transport device 83 of the transporting portion 8 located therebetween. Therefore, in the present embodiment, the deeper end side (back side) along the fore and aft direction D for each rack 2 is the outward side of the storage structure 1, and a proximate side (front side) is the inward side of the storage structure 1. Each rack 2 has a plurality of storage sections S arranged in vertical rows and horizontal rows (along right and left direction). And each storage section S is configured to independently store a container C.

Figure 2:
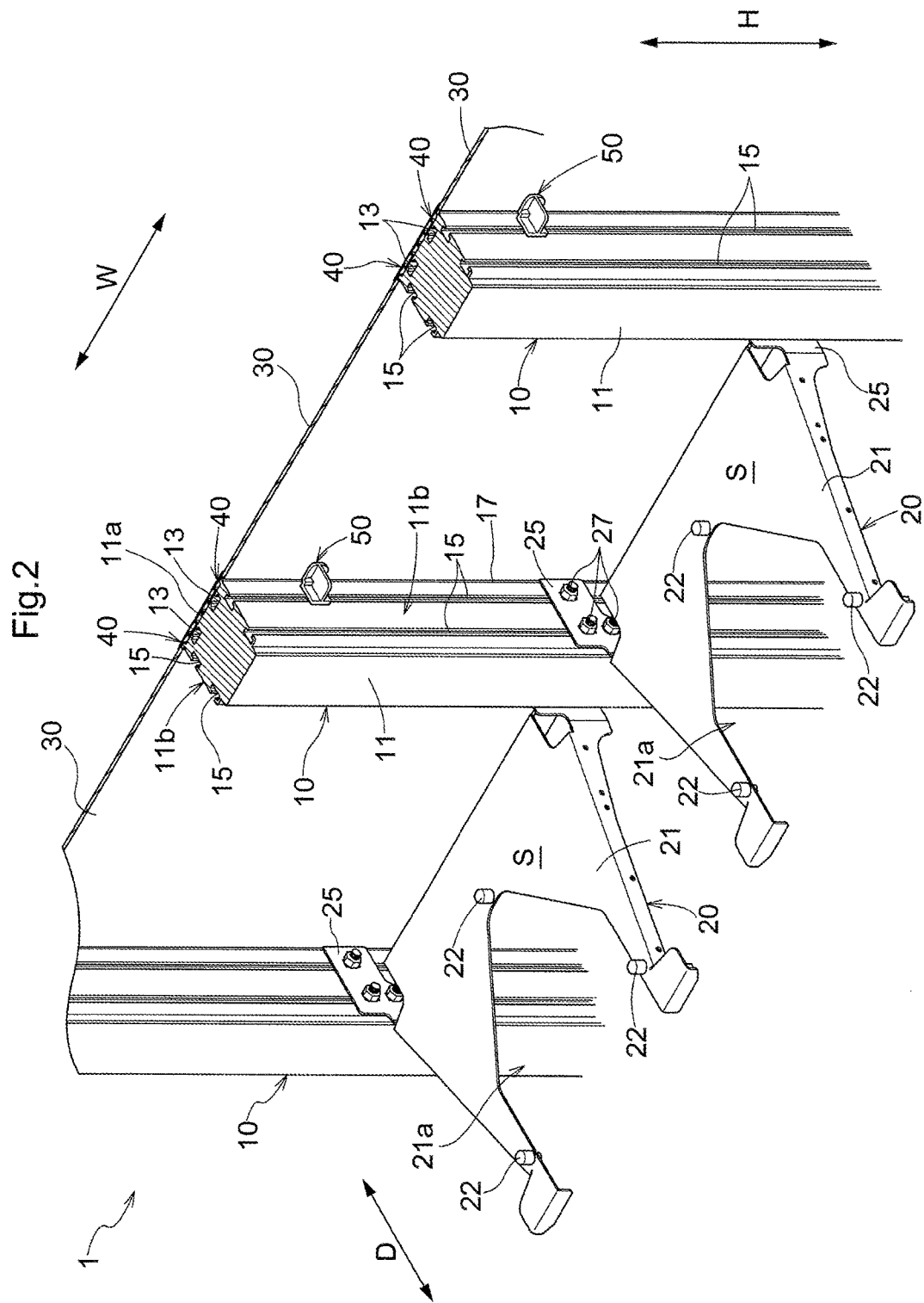
FIG. 2 is a perspective view of an important portion of the storage structure.
Figure 3:
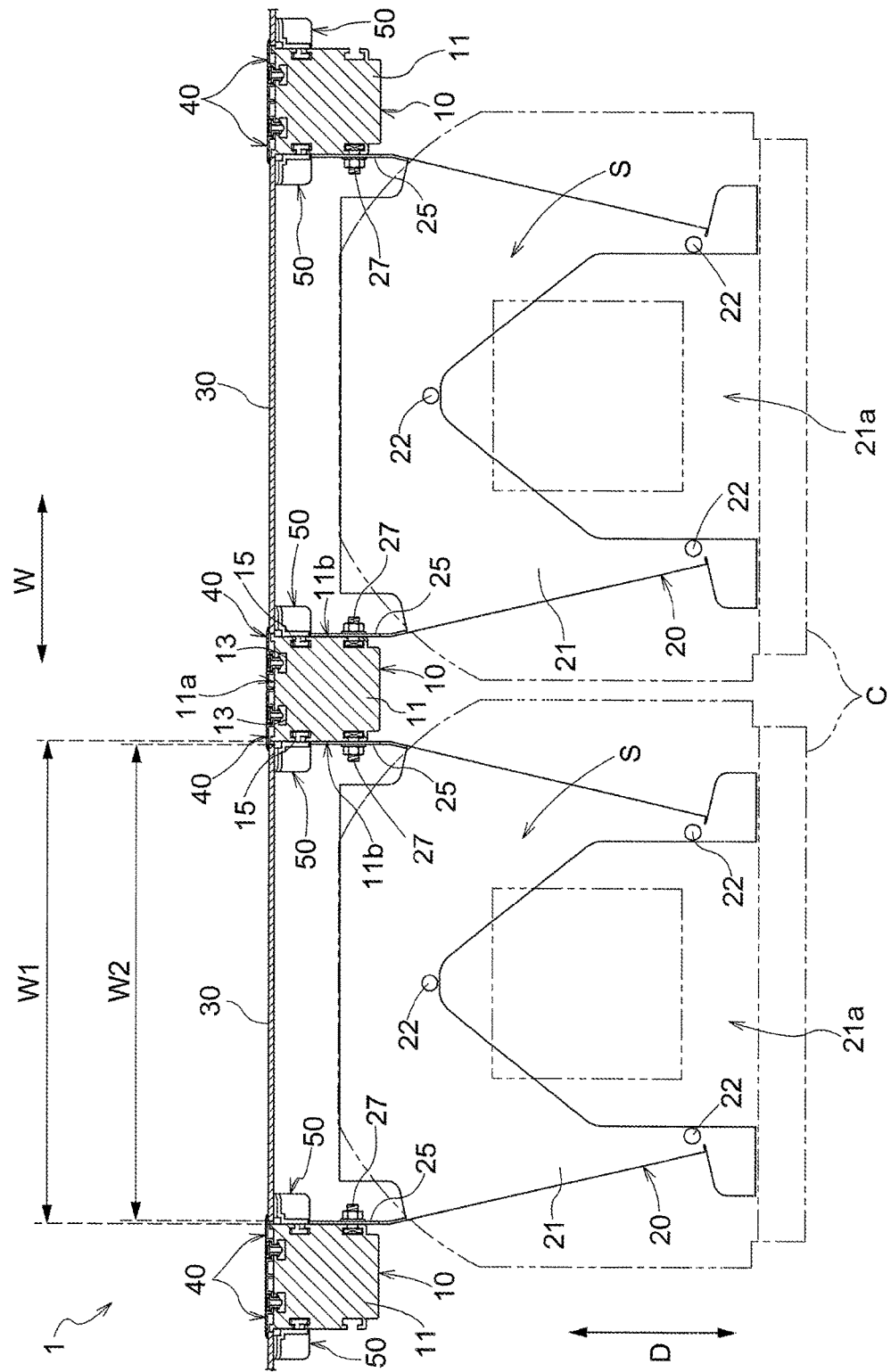
FIG. 3 is a plan view of the important portion of the storage structure.

As shown in FIGS. 2 and 3, the storage structure 1 has a plurality of columns 10 arranged vertically along the height direction H, and support portions 20 each of which is supported by two columns 10 and is configured to support a container C. In addition, the storage structure 1 is provided with outside surface panels 30 for covering a back side of the storage structure 1 and outward-side pressing members 40 each for applying pressure on the corresponding outside surface panel 30 from the back side of the outside surface panel 30 (i.e., from the outward side of the storage structure 1). In addition, the storage structure 1 is provided with, as an arrangement characteristic of the present embodiment, inward-side pressing members 50 each for applying pressure on the corresponding outside surface panel 30 from the front side of the outside surface panel 30 (i.e., from the inward side of the storage structure 1).

The plurality of columns 10 are spaced apart from each other along the lateral width direction W. These plurality of columns 10 are installed such that they are located at equal intervals along a line along the lateral width direction W. In the present embodiment, the lateral width direction W which is the direction along which the plurality of columns 10 are spaced apart from each other, is, or corresponds to, the "spaced-apart direction." Each column 10 is formed of metal, such as aluminum, magnesium, copper, steel, titanium, or nickel, among other possibilities. Metal profile members manufactured by hot extrusion molding using any one, or a combination, of these metals as raw material, or example, may be used as the columns 10. Each column 10 has, as its main component, a column main body 11 whose cross-sectional shape, with the cross-section taken along a flat surface that is perpendicular to the height (vertical) direction H, is generally formed in a shape of a rectangle. The expression "generally formed in a shape of a rectangle" or more simply "rectangular-shape", "rectangular-shaped" or any similar expression refers to a rectangle or a shape that may have one or more portions which may not be a part of a rectangle but that may be considered to be roughly rectangular in shape as a whole. (The same principle applies to any other expression for describing a shape, etc. that includes the word "shape", or "shaped" regardless of whether it is used in conjunction with the word "generally" such as in an expression "generally formed in a shape of". This principle also applies to an expression "generally flush with each other" used below.)

The column main body 11, having a rectangular-shaped cross section which forms at least a part of a column 10, has a first target surface 11a on the back side which is on the outward side of the storage structure 1, and second target surfaces 11b each of which extends at an angle with this first target surface 11a. In the present embodiment, each column main body 11 has a first target surface 11a located on the outward side (back side) and two second target surfaces 11b which are located on opposite lateral sides and each of which extends perpendicular to the first target surface 11a. Each second target surface 11b is so positioned to face a side surface (a second target surface 11b) of the column main body 11 of another column 10 located adjacent thereto along the lateral width direction W.

Figure 4:
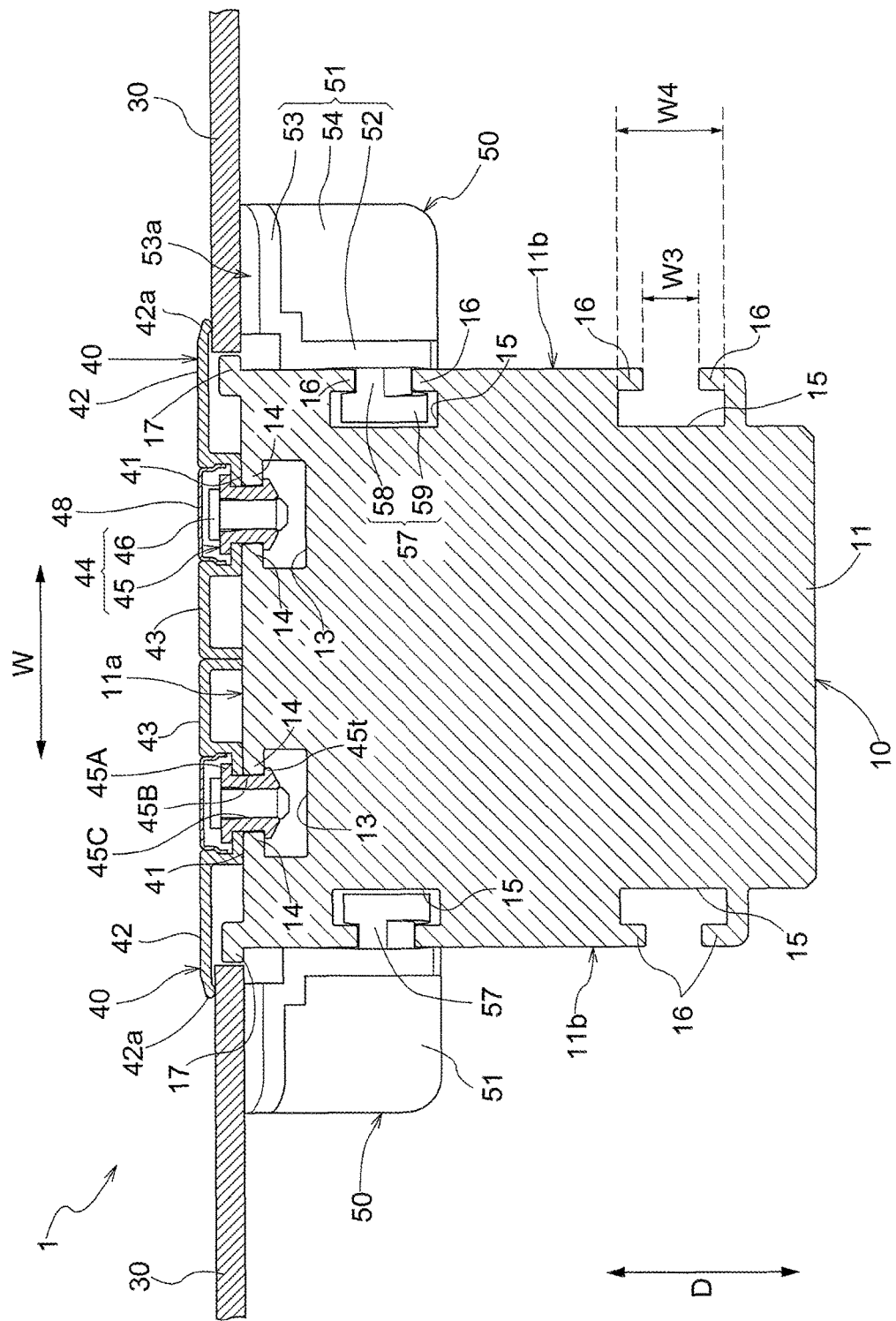
FIG. 4 is a cross-sectional view of an important portion of the storage structure.

As shown in FIGS. 2-4, formed in each column main body 11 are fixing slots 13, each of which opens toward the first target surface 11a side (back side). Each fixing slot 13 is formed to extend continuously along the height (vertical) direction H. A pair of protruding pieces 14 (see FIG. 4) are formed in the portions of the column main body on the side to which each fixing slot 13 opens, with each protruding piece 14 protruding from one edge of the corresponding fixing slot 13 toward the central portion of the fixing slot 13. Each pair of these protruding pieces 14 is formed such that the protruding ends thereof are spaced apart from each other to form a predetermined gap. And the width of the opening of each fixing slot 13 is defined by this gap. In the present embodiment, each fixing slot 13 is formed such that it has a slot width that is greater than the width of the opening of the fixing slot 13. In the present embodiment, two fixing slots 13 are formed in the first target surface 11a of each column main body 11 such that these fixing slots 13 are spaced apart from each other along the lateral width direction W.

Formed in each column main body 11 are attaching slots 13, each of which opens toward the corresponding second target surface 11b side (or a lateral surface side). Each attaching slot 15 is formed to extend continuously along the height (vertical) direction H. A pair of protruding pieces 16 (see FIG. 4) are formed in the portions of the column main body on the side to which each attaching slot 15 opens, with each protruding piece 16 protruding from one edge of the corresponding attaching slot 15 toward the central portion of the attaching slot 15. Each pair of these protruding pieces 16 is formed such that the protruding ends thereof are spaced apart from each other to form a predetermined gap. And the width of the opening W3 of each attaching slot 15 is defined by this gap. In the present embodiment, each attaching slot 15 is formed such that it has a slot width W4 that is greater than the width of the opening W3 of the attaching slot 15. In the present embodiment, two attaching slots 15 are formed in each of the two second target surfaces 11b of each column main body 11 such that the attaching slots 15 are spaced apart from each other along the fore and aft direction D.

The two attaching slots 15 spaced apart from each other along the fore and aft direction D are provided primarily for fixing fastening members 27 for fixing the support portions 20 to the corresponding column 10 (see FIG. 2). As will be described in more detail below, an additional feature of the present embodiment is that the attaching slots 15 on the deeper end side are also used to attach inward-side pressing members 50 to the corresponding column 10. In other words, the inward-side pressing members 50 can be attached and mounted to the columns 10 by making effective use of existing structure in the columns 10 for fixing the support portions 20 without having to require any changes in the structure of the columns 10.

In the present embodiment, each column 10 has a projection 17 in a boundary portion (of the column main body 11) between the first target surface 11a and each second target surface 11b (see FIG. 4). Each projection 17 is formed to project along the lateral width direction W beyond the second target surface 11b, at a location further toward the back side than the first target surface 11a of column main body 11. This projection 17 functions as a positioning member for properly positioning the support portion 20 along the fore and aft direction D when installing the support portion 20 to the column 10.

As shown in FIGS. 2 and 3, each support portion 20 is being fixed to, and between, two mutually adjacent columns 10. Each support portion 20 is fixed in a cantilever manner to each column 10 by the deeper end side (back side), along the fore and aft direction D, of the support portion 20. The support portion 20 is formed of, for example, metal etc. Each support portion 20 has a support main body 21 configured to receive and support from below a container C placed thereon, and a pair of attaching plate portions 25 each of which is fixed to the corresponding column 10.

Each support main body 21 is generally formed in a plate shape that extends along the lateral width direction W and the fore and aft direction D. The support main body 21 has a cutout portion 21 generally formed in a five-cornered shape in plan view, on the front side so that the support main body 21 is generally formed to have a U-shape in plan view. The cutout portion 21a of the support main body 21 serves as a space through which the support member 88 provided to the transfer device 87 is moved vertically.

A plurality (three in the present example) of projecting pins 22 are provided on the top surface of each support main body 21 such that they project upward. The engaging recess portions (not shown) which consist of grooves, or holes, etc. are formed in the bottom surface of each container C so that a container C is properly positioned on the support main body 21 with the projecting pins 22 and the corresponding engaging recess portions of the container C engaging each other. One or more load presence sensors (not shown) each consisting of, for example, a pressure-sensitive sensor etc. are also provided on the top surface of each support main body 21.

Each of the pair of attaching plate portions 25 is generally formed in the shape of a flat plate that extends along the height or vertical direction H and the fore and aft direction D. The attaching plate portions 25 in a pair are located at both end portions (with one at each end portion), along the lateral width direction W, of the corresponding support portion 20 such that they face each other along the lateral width direction W. And the attaching plate portions 25 in a pair are so located that each faces and contacts the side surface (a second target surface 11b) of the corresponding column 10. Each attaching plate portion 25 has formed therein a plurality of insert holes which are through holes that extend along the direction of the thickness of the attaching plate portion 25 (the lateral width direction W in the present example). The support portion 20 is fixed to a column 10 by means of fastening members 27 that extend through the insert holes to engage, or be fixed within, the attaching slots 15. Note that the support portion 20 is fixed to the columns 10 and is appropriately positioned along the fore and aft direction D with the back end portion of each attaching plate portion 25 in contact with the corresponding projection 17 of the column main body 11.

As shown in FIGS. 2 and 3, the outside surface panels 30 are provided to partition the internal space (space that contains the collection of the storage sections S) of the storage structure 1 off from the space outside the storage structure 1. This outside surface panels 30 also function as panel members that form the peripheral wall portions 92 of the storage structure 1 (see FIG. 1). The outside surface panels 30 are formed of, for example, resin or metal, etc. Each outside surface panel 30 is generally formed in a shape of a flat plate that has a predetermined height (vertical dimension) and a width.

In the present embodiment, the width of each outside surface panel 30 is set to be less than the distance W1 between two mutually adjacent columns 10 (referred, hereinafter, as the "inter-column separation distance"). In other words, each outside surface panel 30 is formed to have a width W2 (referred to, hereinafter, as the "panel width") that is less than the inter-column separation distance W1. In the present embodiment, the panel width W2 of the outside surface panels 30 is set to be slightly less than the inter-column separation distance W1 (i.e., a value approximately equal to, and less than, the inter-column separation distance W1). Note that the inter-column separation distance W1 is the dimension, along the lateral width direction W, of the space formed between two mutually adjacent columns 10. In the present embodiment, the inter-column separation distance W1 is the dimension, along the lateral width direction W, of the space formed between the distal end portions of two opposing projections 17 (that face each other) of any two adjacent columns 10. Each outside surface panel 30 formed to have such a width is so located that the outside surface panel 30 in its entirety is accommodated within the area, along the lateral width direction W, between two mutually adjacent columns 10.

In conventional storage structures, the outside surface panels 30 are formed to have their panel width W2 greater than the inter-column separation distance W1, and are placed on the outward side (i.e., on the back side) of the columns 10 so that the outside surface panels 30 can be removed only from the outward side of the columns 10. In other words, in this conventional structure, because the columns 10 have a function to fix the outside surface panels 30, the outside surface panels 30 can be removed only from the outward side of the columns 10 so that the columns 10 located on the inward side (front side) of the outside surface panels 30 do not present physical obstacles. However, as shown, for example, in FIG. 1, when the storage structure 1 is installed close to an external structure (a wall 99, etc., of the facility in which the storage facility 100 is installed), it would be practically impossible, with such conventional structure, to perform work on the outward side of the storage structure 1 and the outside surface panels 30 cannot be removed.

To address this issue, in the storage structure 1 of the present embodiment, a new attaching structure for the outside surface panels 30 is adopted so as to allow the outside surface panels 30 to be removed or attached not only from the outward side but also from the inward side. The attaching structure of the present embodiment is realized using outward-side pressing members 40 and inward-side pressing members 50, each of which is removably attached to the corresponding column 10.

Figure 8:
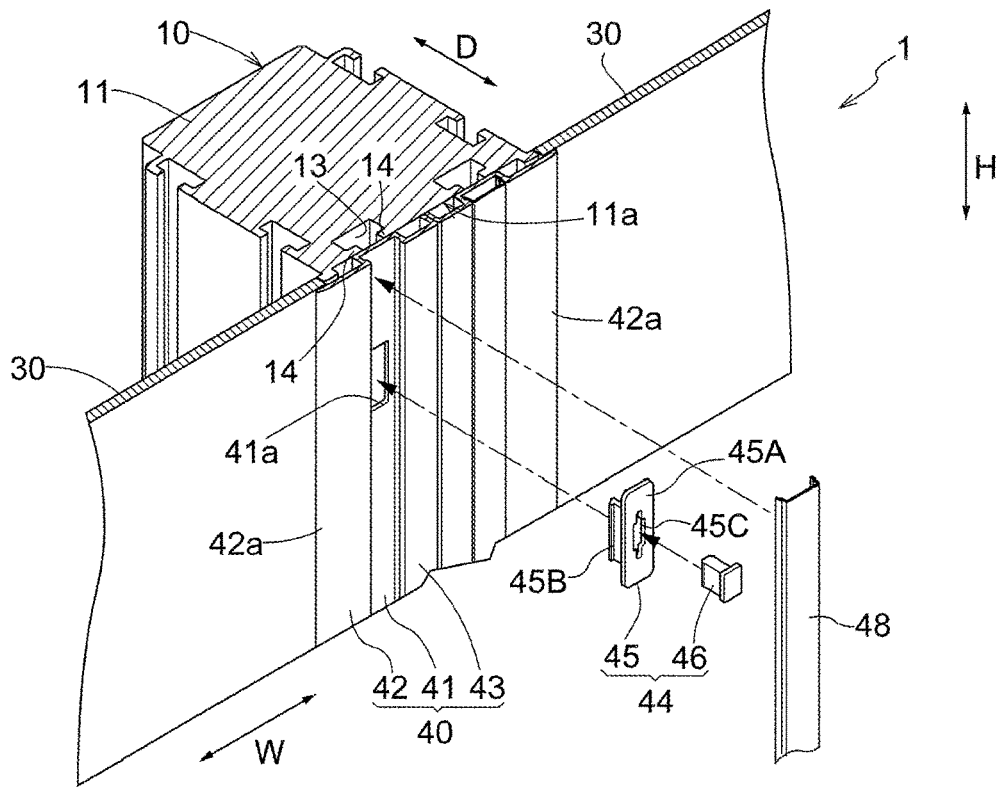
FIG. 8 is a perspective view showing how an outward-side pressing member is attached.

Each outward-side pressing member 40 is removably attached to the first target surface 11a of the corresponding column 10. As shown in FIGS. 4 and 8, each outward-side pressing member 40 assists in holding an outside surface panel 30 between itself and an inward-side pressing member 50 by holding, or applying pressure on, the outside surface panel 30 from both sides in cooperation with the inward-side pressing member 50 to assist in holding the outside surface panel 30 in place, with the outward-side pressing member 40 attached to the column 10. The outward-side pressing member 40 of the present embodiment cannot hold an outward-side pressing member 40 against a column 10 by itself, and is fixed to the column 10 using fixing members 44. Each outward-side pressing member 40 is formed of, for example, resin or metal, etc. Each outward-side pressing member 40 can be manufactured, for example, by extrusion molding. Each outward-side pressing member 40 is generally formed in a shape of a long plate that extends along the corresponding column 10 along the height direction H. In the present embodiment, two outward-side pressing members 40 are provided for each column main body 11 to correspond to the fact that two fixing slots 13 are formed in the first target surface 11a of each column main body 11.

Each outward-side pressing member 40 has an attaching base portion 41 configured to be positioned to contact the first target surface 11a of the corresponding column 10, as well as a pressing plate portion 42 and an abutting plate portion 43, each of which extends along the lateral width direction W from the attaching base portion 41. The attaching base portion 41, the pressing plate portion 42, and the abutting plate portion 43 which together form an outward-side pressing member 40 are formed integrally. The attaching base portion 41 is positioned to be in contact with a first target surface 11a such that it is located over the corresponding fixing slot 13. The insert holes 41a (see FIG. 8) are formed in each attaching base portion 41 at predetermined intervals (with the interval being a value between, for example, 150 mm-600 mm). A locking piece 45B of a first member 45 which forms a part of a fixing member 44 is inserted into this insert hole 41a.

The pressing plate portion 42 and the abutting plate portion 43 are offset toward the outward side (back side) with respect to the attaching base portion 41 (so as to be spaced apart from the first target surface 11a). The amount of this offset is set to be greater than the greater of the amount of projection of the the projection 17 and the amount of the projection of the fixing member 44, from the first target surface 11a. The pressing plate portion 42 is formed such that it extends from the attaching base portion 41 and beyond the corresponding second target surface 11b (and beyond the distal end of the projection 17 in the present embodiment) along the lateral width direction W. The pressing plate portion 42 assists in holding, or applies pressure on, an outside surface panel 30 from the outward side (back side) with its edge portion 42a located beyond the distal end of the projection 17. The abutting plate portion 43 is formed to extend, along the lateral width direction W, from the attaching base portion 41 in the opposite direction from the pressing plate portion 42. Each abutting plate portion 43 is positioned such that it is in contact, along the lateral width direction W, with the abutting plate portion 43 of another outward-side pressing member 40 that is attached to the same column main body 11.

In the present embodiment, each fixing member 44 for fixing the outward-side pressing member 40 to a column 10 is configured such that it can be attached to and removed from the column 10 by a worker by directly and manually operating the fixing member 44 using his/her fingers. Each of such fixing members 44, which can be attached and removed without having to use any tool, has two components, namely, a first member 45 and a second member 46 which are used in conjunction with each other in the present embodiment. The first member 45 and the second member 46 are formed of, for example, resin etc. The first member 45 has a fixing main body portion 45A which is formed to be larger in size than the insert hole 41a formed in the attaching base portion 41 and which covers the insert hole 41a, and a pair of locking pieces 45B each of which is formed to protrude or project from the fixing main body portion 45A. The distal or free end portion of each locking piece 45B has a locking claw 45t which can engage an inner surface (surface that faces the deeper end of the fixing slot 13) of the corresponding protruding piece 14 formed in the column 10. In addition, the first member 45 has a through hole 45C which extends through the fixing main body portion 45A in the direction of its thickness, in a central area of the fixing main body portion 45A.

A worker on the outward side of the storage structure 1 can attach an outward-side pressing member 40 to the first target surface 11a of a column 10 by taking the following steps. Firstly, with the outward-side pressing member 40 located such that the fixing slot 13 of the column 10 and the insert hole 41a of the attaching base portion 41 overlap each other as seen from the outward side (back side), the worker inserts, from an outward side, the locking piece 45B of the first member 45 which forms a part of a fixing member 44 into the insert hole 41a, while allowing the locking piece 45B to deform elastically. Once the locking piece 45B has been inserted and has returned to its original shape or attitude under its elastic restoring force, the first member 45 would be holding together the protruding piece 14 and the attaching base portion 41, with the protruding piece 14 and the attaching base portion 41 held between, and pressed on by, the fixing main body portion 45A and the locking claw 45t. Subsequently, the worker inserts a second member 46 into the through hole 45C formed in each fixing main body portion 45A from the outward side to lock the shape or the attitude of the locking piece 45B in place, with a result that the outward-side pressing member 40 is stably attached to the first target surface 11a of the column 10.

Subsequently, to cover and conceal each fixing member 44, a decorative covering 48 is installed to the outward side recess created by the offset positioning of the pressing plate portion 42 and the abutting plate portion 43 with respect to the attaching base portion 41. The decorative covering 48 may be formed of, for example, resin, etc. It is preferable that the pressing plate portion 42, the decorative covering 48, and the abutting plate portion 43 are generally flush with each other.

Figure 11:
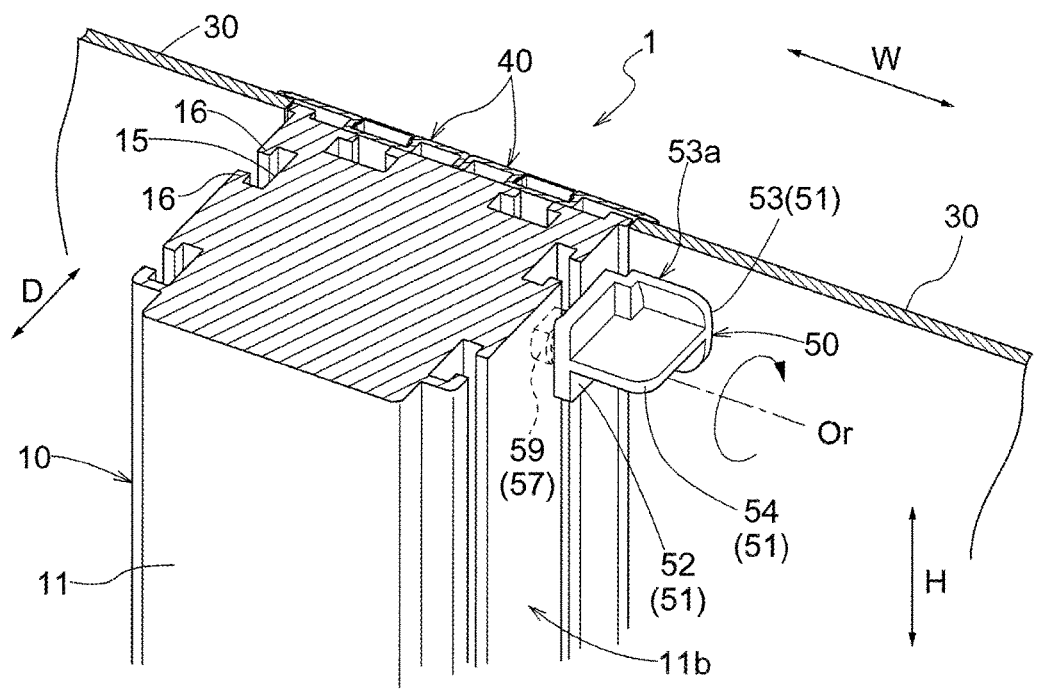
FIG. 11 is a perspective view showing how the inward-side pressing member is attached.

Each inward-side pressing member 50 is removably attached or mounted to a second target surface 11b of a column 10. As shown in FIGS. 4 and 11, with an inward-side pressing member 50 attached to a column 10, the inward-side pressing member 50 assists in holding the corresponding outside surface panel 30 between itself and an outward-side pressing member 40 by holding, or applying pressure, from both sides in cooperation with the outward-side pressing member 40 to assist in holding the outside surface panel 30 in place. Each inward-side pressing member 50 of the present embodiment is configured to be capable of remaining attached to a column 10 by itself. The inward-side pressing member 50 is formed of, for example, resin, such as, polyethylene, polypropylene, polyvinyl chloride, polystyrene, polyamide, polycarbonate, polyethylene terephthalate, and polybutylene terephthalate. The inward-side pressing member 50 can be manufactured, for example, by injection molding. The inward-side pressing member 50 is generally formed in a shape of a block. And a plurality of inward-side pressing members 50 are located to be spaced apart from each other along the height or vertical direction H at predetermined intervals (with the interval being a value between, for example, 300 mm-1000 mm) The distance between any two mutually adjacent inward-side pressing members 50 along the height direction H may be constant throughout the entire storage structure 1 or may vary.

The inward-side pressing member 50 is configured such that it can be attached to and removed from a column 10 by a worker by directly and manually operating the inward-side pressing member 50 using his/her fingers. In other words, the inward-side pressing member 50 can be removed from and attached to a column 10 without having to use any tool, such as a spanner, for example (i.e., in a tool-less manner). Further, in the present embodiment, the inward-side pressing member 50 is configured such that it can be attached to and removed from a column 10 by directly rotating the inward-side pressing member 50 along, or parallel to, the corresponding second target surface 11b.

Figure 5:
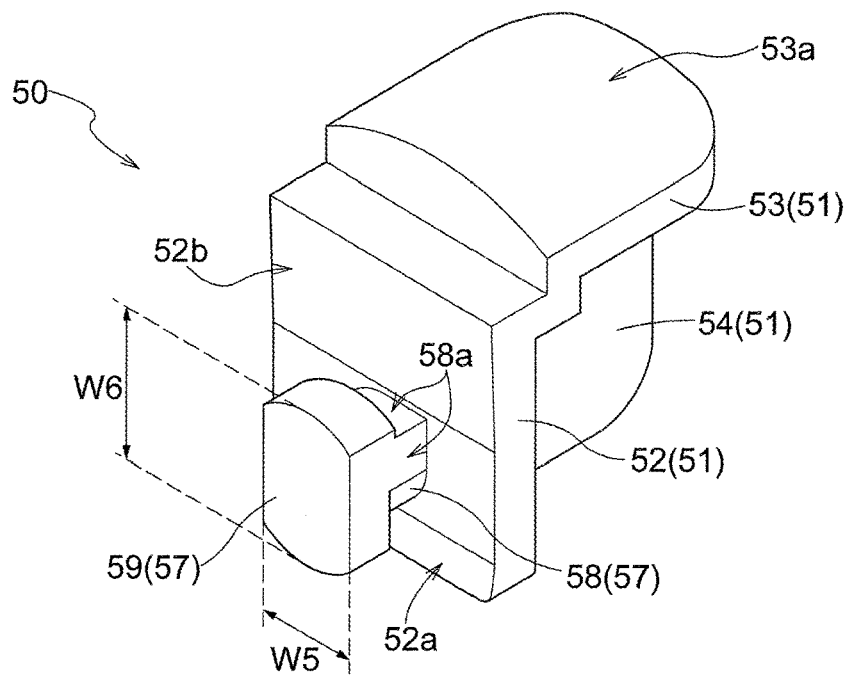
FIG. 5 is a perspective view of an inward-side pressing member.
Figure 6:
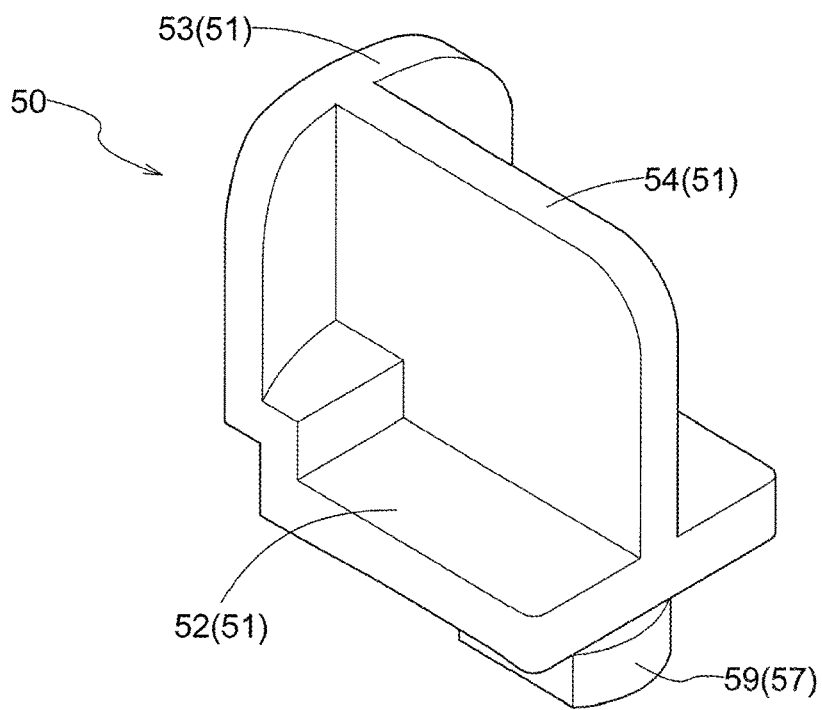
FIG. 6 is another perspective view of the inward-side pressing member.

As shown in FIGS. 5-7, the inward-side pressing member 50 has a pressing main body portion 51 generally formed in a shape of a block, and an attachment portion 57 which projects from this pressing main body portion 51. The pressing main body portion 51 and the attachment portion 57 which form the inward-side pressing member 50 are formed integrally. The pressing main body portion 51 has a pressing surface 53a which is generally formed in a shape of a circular-arc surface, and which contacts the outside surface panel 30 when the pressing main body portion 51 is attached to the column 10. Note that a "circular-arc surface" is a surface that is traced out by a trajectory of a circular arc as it is moved horizontally along the lateral width direction W.

The pressing main body portion 51 of the present embodiment consists of a plurality of plate-shape portions (portions each of which is generally formed in a shape of a plate (a thin material)) that are integrated together such that they extend at an angle with each other. In the present embodiment, the pressing main body portion 51 consists of a total of three plate-shape portions that are integrated together such that they extend at an angle with each other, namely, a first plate-shape portion 52, a second plate-shape portion 53, and a third plate-shape portion 54.

The first plate-shape portion 52 is generally formed in a shape of a flat plate. The first plate-shape portion 52 is so located that it can face and contact the second target surface 11b of a column 10, and functions as a proximal end plate-shape portion. The second plate-shape portion 53 is generally formed in a shape of a curved plate (general shape of a circular-arc plate). The second plate-shape portion 53 has a outward facing surface which serves as a pressing surface 53a configured to contact an outside surface panel 30 to allow the second plate-shape portion to function as a pressing plate-shape portion. In the present embodiment, the second plate-shape portion 53 is formed such that the pressing surface 53a has a constant curvature. In addition, the second plate-shape portion 53 is formed such that the center of curvature Oc of the pressing surface 53a coincides with the center of rotation Or of a rotating operation of the inward-side pressing member 50 (see FIG. 13). The third plate-shape portion 54 is formed in a shape of a flat plate. In the present embodiment, the entire pressing main body portion 51 is generally formed in a shape that is symmetrical with respect to a plane. The third plate-shape portion 54 is formed in a shape of a flat plate that extends along the plane of symmetry of the pressing main body portion 51. In addition, the third plate-shape portion 54 is formed in a shape of a flat plate that includes the center of rotation Or of the rotating operation of the inward-side pressing member 50 (see FIG. 13). Because the third plate-shape portion 54 extends perpendicular to both the first plate-shape portion 52 and the second plate-shape portion 53, it functions as a type of a reinforcing rib, and can also function as an operated portion (a knob) to be used when a worker manually rotates the inward-side pressing member 50.

This arrangement (of the pressing main body portion 51 consisting of a plurality of plate-shape portions 52, 53, and 54 which extend at an angle with each other) adds a certain amount of strength to the pressing main body portion 51, and also makes it possible to manufacture the main body portion 31 with a small amount of material, which can reduce the manufacturing cost (including the material cost). In addition, this arrangement also makes it less likely for shrink marks to occur even when the pressing main body portion 51 made of resin is manufactured by injection molding; thus, the inward-side pressing member 50 can be manufactured with greater accuracy in its dimensions. It is also preferable, from a viewpoint of preventing shrink marks from occurring, that each of the first plate-shape portion 52, the second plate-shape portion 53, and the third plate-shape portion 54 which form the pressing main body portion 51 has the same and uniform thickness. The expression "the same and uniform thickness" is a concept that includes not only a thickness that is precisely the same and constant, but also a thickness that may vary to some extent (for example, plus or minus 10% or less from the average thickness) and should be interpreted as such.

In the present embodiment, the surface (of the first plate-shape portion 52 of the pressing main body portion 51) for facing and contacting a second target surface 11b of a column 10 is not a perfectly flat surface but includes a first sloped surface 52a and a second sloped surface 52b which are surfaces that are slightly sloped. By including such first sloped surface 52a and second sloped surface 52b, the first plate-shape portion 52 slides against, and in partial contact with, the second target surface 11b of the column 10 (as opposed to the entire surface contacting the second target surface 11b), as the inward-side pressing member 50 is rotated. This helps reduce the sliding resistance during the rotating operation, and thus allows the rotating operation to be performed smoothly.

Figure 7A:
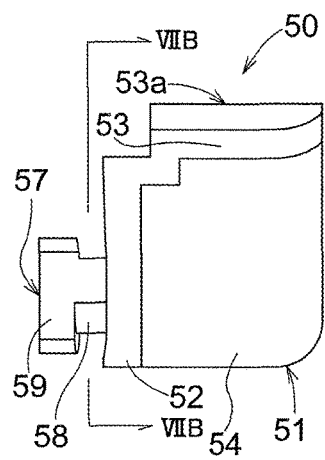
FIGS. 7A-7G show the inward-side pressing member as seen from six different view points, with 7A showing a front view, 7B showing a cross-sectional view taken along VIIB-VIIB in the front view 7A, 7C being a plan view (top view), 7D being a bottom view, 7E being a rear view, 7F being a left-hand side view, and 7G being a right-hand side view.
Figure 7B:
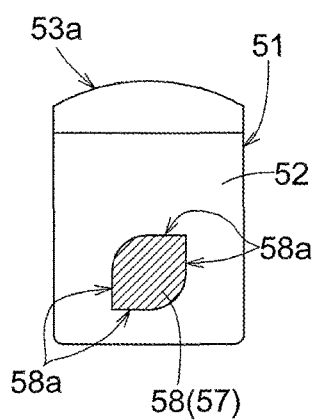

The attachment portion 57 has an insert shank 58 which can be inserted into an opening (gap opening between a pair of protruding pieces 16) formed on the second target surface 11b side of the attaching slot 15, and a retaining piece 59 provided to an end portion of this insert shank 58. In the present embodiment, the attachment portion 57 is generally formed in a shape that has a rotational symmetry, and, in particular, a rotational symmetry of order 2 under a rotation about the insert shank 58. The insert shank 58 functions as the center of rotation (or rotational center) Or when manually rotating the inward-side pressing member 50. The insert shank 58 is formed to project from the first plate-shape portion 52 in the opposite direction from the direction in which the second plate-shape portion 53 and the third plate-shape portion 54 project from the first plate-shape portion 52. The insert shank 58 has a cross-section, taken along a plane perpendicular to the direction along its axis (length), that is generally formed in a shape of a partially rounded quadrilateral (see FIG. 7B showing a cross-section taken at VIIB-VIIB in FIG. 7A) in which each of two diagonally opposite corners forms a right (or 90 degree) angle whereas the other two diagonally opposite corners are rounded. Two surfaces that form a right-angle corner function as contact surfaces 58a that contact respective end surfaces on the projecting ends of respective protruding pieces 16 when in different attitudes (i.e., one contact surface 58a is in contact with the end surface on the projecting end of one protruding piece 16 when the inward-side pressing member 50 is in one attitude whereas the other contact surface 58a is in contact with the end surface on the projecting end of the other protruding piece 16 when the inward-side pressing member 50 is in another attitude). The insert shank 58, whose cross-section is generally formed in a shape of a partially rounded quadrilateral, can be rotated through an angle within a range of about 0 degree-90 degrees, with the inserted shank 58 inserted in the opening on the second target surface 11b side of the attaching slot 15.

The retaining piece 59 is provided to the end portion of the insert shank 58 that is on the opposite side from the pressing main body portion 51. The retaining piece 59 is generally formed in a shape of a plate that has an oblong, elliptical, oval or a racetrack shape. The width W5, along the shorter side, of the retaining piece 59 is set to be equal to, or slightly less than, the width W3 of the opening of the attaching slot 15. The width W6, along the longer side, of the retaining piece 59 is set to be less than the slot width W4 of the attaching slot 15 and greater than the width W3 of the opening of the attaching slot 15. As such, the retaining piece 59 is formed to have a greater dimension at least along one direction (the longitudinal or lengthwise direction in the present example) than the width of the opening W3 of the attaching slot 15. The retaining piece 59 is formed to be so oriented that the pressing surface 53a is located on an imaginary line extending along its longitudinal direction.

Figure 9:
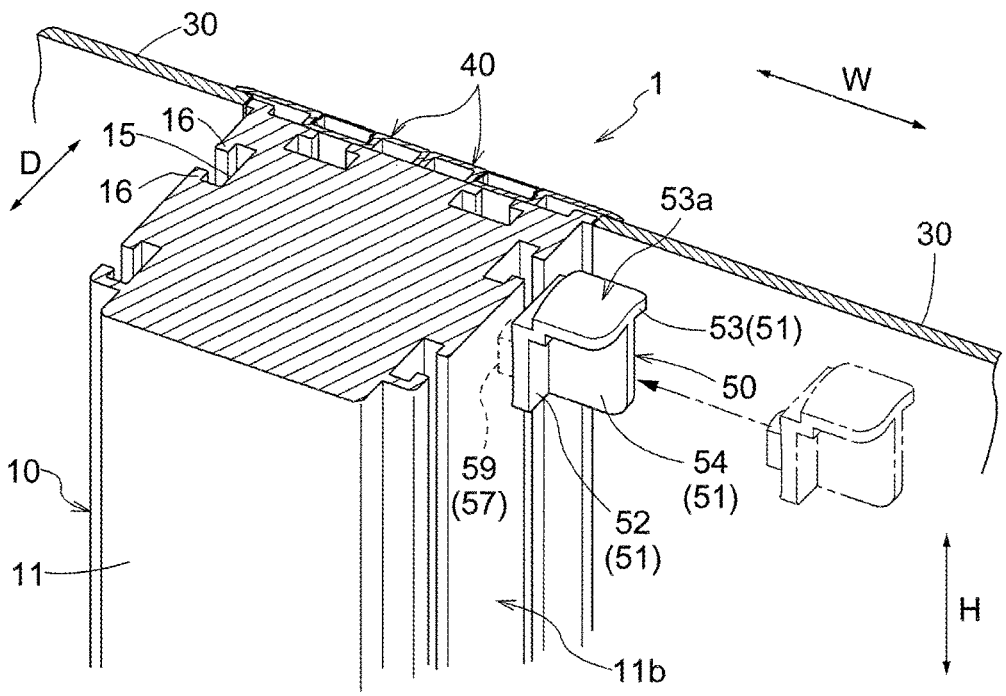
FIG. 9 is a perspective view showing how an inward-side pressing member is attached.
Figure 10:
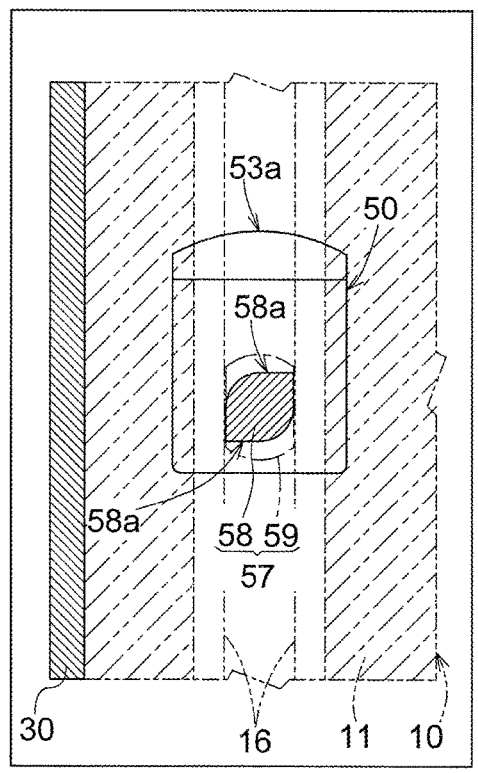
FIG. 10 is a drawing for explaining how the inward-side pressing member is attached.
Figure 12:
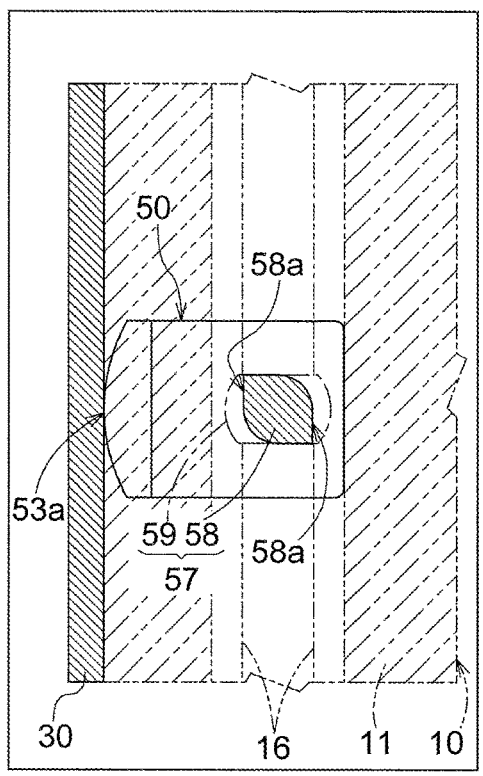
FIG. 12 is a drawing for explaining how the inward-side pressing member is attached.

A worker who has entered the storage structure 1 through the entrance can attach an inward-side pressing member 50 to a second target surface 11b of a column 10 by taking the following steps. Firstly, as shown in FIGS. 9 and 10, the worker places the inward-side pressing member 50 in an attitude (insertion attitude) in which the longitudinal or lengthwise direction of the retaining piece 59 is along the height or vertical direction H with the retaining piece 59 facing the second target surface 11b of the column 10. In this insertion attitude, the retaining piece 59 is inserted through the opening of the attaching slot 15 until the retaining piece 59 enters and is within the attaching slot 15. While in this position, the worker holds the third plate-shape portion 54, for example, with his/her fingers, and rotates the inward-side pressing member 50 (see FIG. 11 and FIG. 12). At this time, the inward-side pressing member 50 is rotated until a contact surface 58a of the insert shank 58, that was facing either upward or downward in the insertion attitude, contacts the end surface on the projecting end of a protruding piece 16. As a result, the protruding pieces 16 are held between the first plate-shape portion 52 and respective end portions, along the longitudinal direction, of the retaining piece 59 (see FIG. 4); thus, the inward-side pressing member 50 is attached to the second target surface 11b of the column 10.

Note that, in the present embodiment, the state or the position of the inward-side pressing member 50 immediately after it is inserted in the attaching slot 15 as shown in FIG. 9 is defined as the "zero degree phase angle state" for a rotating operation. In addition, the state or the position of the inward-side pressing member 50 immediately after it is rotated as shown in FIG. 11 is defined as the "90 degree phase angle state" for the rotating operation. In the 90 degree phase angle state, the inward-side pressing member 50 is in an attitude (attached attitude) in which the pressing surface 53a, generally formed in a shape of a circular-arc surface, faces outward and is in contact with an outside surface panel 30. This 90 degree phase angle is the "reference phase" (for the phase angle of the inward-side pressing member 50) that is defined in advance as the phase angle for holding the outside surface panel 30 between the inward-side pressing ember 50 and an outward-side pressing member 40.

Figure 7C:
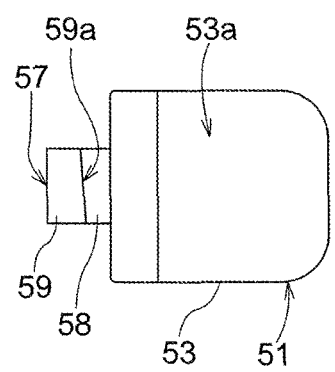
Figure 7D:
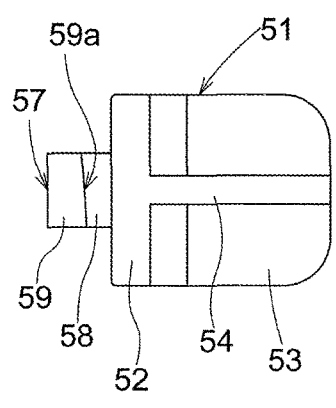
Figure 7E:
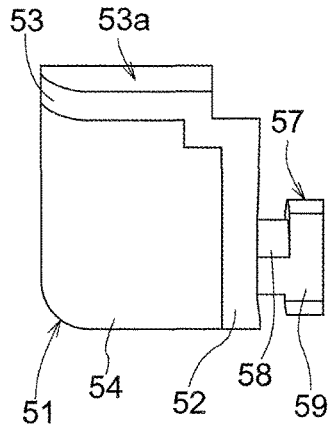
Figure 7F:
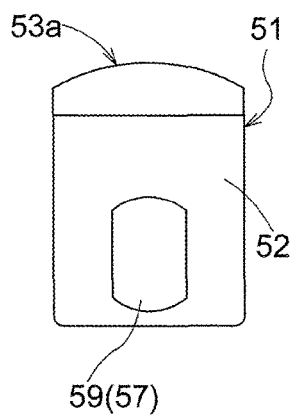
Figure 7G:
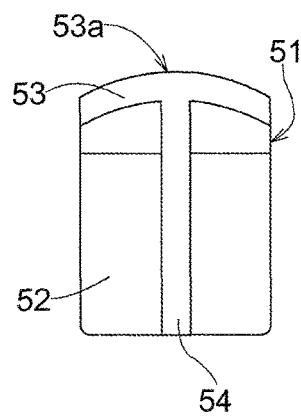

In the present embodiment, as shown in a plan view (top view) of FIG. 7C, and a bottom view of FIG. 7D, each end portion, along the longitudinal direction, of the retaining piece 59 is formed such that its thickness gradually increases from its forward end toward its back end with respect to the direction in which the inward-side pressing member 50 is rotated when attaching it to the column 10 (or "direction of rotation for attaching operation"). Each end portion, along the longitudinal direction, of the retaining piece 59 has a sloped surface 59a which is a slightly sloped surface that is gradually closer to the first plate-shape portion 52 from its forward end toward its back end with respect to the direction of rotation for attaching operation. The slope of the sloped surface 59a is set such that the distance between the retaining piece 59 and the first plate-shape portion 52 at the forward end with respect to the direction of rotation for attaching operation is slightly greater than the thickness of the protruding piece 16, and such that the distance in question at the back end is slightly less than the thickness of the protruding piece 16. Since the forward end side has "play", the protruding piece 16 can be smoothly led into the gap between the retaining piece 59 and the first plate-shape portion 52 at the beginning of the rotating operation; thus, the rotating operation can be started smoothly. And, the binding or holding force of the retaining piece 59 and the first plate-shape portion 52 on the protruding piece 16 becomes gradually stronger as the phase angle increases from the zero degree phase angle toward the 90 degree phase angle; thus, the inward-side pressing member 50 can be attached independently and stably to the column 10.

In the present invention, each outside surface panel 30, whose panel width W2 is less than the inter-column separation distance W1, is held in place by outward-side pressing members 40 and inward-side pressing members 50 which cooperate with each other to hold, or apply pressure on, the outside surface panel 30 from both sides thereof and each of which is removably attached to the corresponding column 10. Note that each outside surface panel 30 is held in place by two outward-side pressing members 40 with one on each side along the lateral width direction W and preferably four or more inward-side pressing members 50 located to be spaced apart from each other along peripheral edge portions of the outside surface panel 30, with the outside surface panel 30 held in place by the outward-side pressing members 40 and the inward-side pressing members 50 which cooperate with each other to hold, or apply pressure on, the outside surface panel 30 from both sides thereof. Therefore, an outside surface panel 30 can be removed from either the outward side or inward side of the storage structure 1, by removing from the columns 10 either the outward-side pressing members 40 or the inward-side pressing members 50 that are holding the outside surface panel 30 in place and therebetween. Conversely, an outside surface panel 30 can be attached from either the outward side or inward side of the storage structure 1 by installing an outside surface panel 30 with either the outward-side pressing members 40 or the inward-side pressing members 50 already attached to the columns 10 and by subsequently attaching the other of the outward-side pressing members 40 and the inward-side pressing members 50 to the columns 10.

Thus, even if the storage structure 1 is installed close to a wall 99, and no sufficient space is available outside the storage structure 1, outside surface panels 30 can be attached and removed from the inward side of the storage structure 1 unlike in the conventional storage structure. Needless to say that, when sufficient space is available outside the storage structure 1, the outside surface panels 30 can be attached and removed from the outward side of the storage structure 1, as well as from the inward side even in that situation. Thus, in accordance with the storage structure 1 of the present embodiment, outside surface panels 30 can be attached and removed regardless of where the storage structure 1 is installed.

During that process, each inward-side pressing member 50 can be easily attached and removed from a column 10 by a worker, by directly and manually rotating it using his/her fingers in one-touch operation without having to use any tool. Therefore, the outside surface panels 30 can be easily attached and removed from the inward side of the storage structure 1. Note that, as the storage structure 1 becomes larger, at least one of the number and the size of the outside surface panels 30 increases; thus, the number of the inward-side pressing members 50 which have to contribute to the holding of the outside surface panels 30 in the storage structure 1 increases dramatically. Thousands of inward-side pressing members 50 may be required depending on the size of the storage structure 1. It can be said, when one takes such a situation into consideration, that the technology of the present embodiment, by which each inward-side pressing member 50 can be attached and removed easily in one-touch operation, can provide a significant benefit and result especially when it is applied to a large storage structure 1 used in a large facility, such as a storage facility 100. In addition, the inward-side pressing members 50 themselves have a simple appearance and are of good design as pressing members that can be removably attached to columns provided to a storage structure for holding outside surface panels that are likewise attached to the columns.

In the present embodiment, the outward-side pressing members 40 can also be easily attached and removed by directly and manually placing the fixing member 44 that are provided separately from the outward-side pressing members 40 using his/her fingers without having to use any tool. Therefore, the outside surface panels 30 can also be easily attached and removed from the outward side of the storage structure 1.

Figure 13:
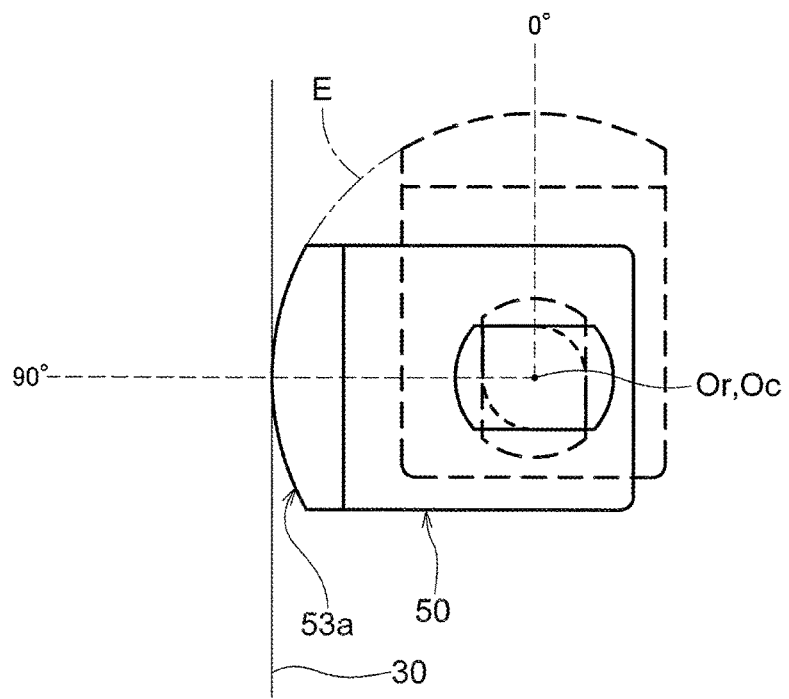
FIG. 13 is a drawing for explaining a design philosophy of the inward-side pressing member.

Further, in the present embodiment, as shown in FIG. 13, each inward-side pressing member 50 is formed such that the pressing surface 53a has a constant curvature and such that the center of rotation Or of a rotating operation of the inward-side pressing member 50 coincides with the center of curvature Oc of the pressing surface 53a. With such arrangements, the enveloping surface E traced out by the pressing surface 53a as the inward-side pressing member 50 is rotated coincides with the pressing surface 53a. Therefore, even when the phase angle of the inward-side pressing member 50 is somewhat different from the reference phase (90 degree phase angle), the pressing surface 53a can be reliably in contact with the outside surface panel 30. Therefore, the outside surface panel 30 can be fixed firmly in place without having to adjust the attached attitude of each inward-side pressing member 50 with strict accuracy so that the outside surface panels 30 can be attached and removed from the inward side of the storage structure 1 with even greater ease. In this regard also, the technology of the present embodiment, which does not require highly precise attitude adjustment when attaching each inward-side pressing member 50, can provide a significant benefit and result especially when it is applied to a large storage structure 1.

For example, when the articles held in the container C are easily oxidized material, such as semiconductor substrates, gas supplying devices may be provided in the storage structure 1 to supply inert gas to each of the containers C stored in the storage sections S. Note that each gas supplying device includes for example, pipes through which inert gas flows and a flow regulator which is provided in one of the pipes for adjusting the flow rate of the inert gas. When such gas supplying devices need to be added to the existing storage structure 1, it is sometimes convenient to temporarily remove the outside surface panels 30 for ease and efficiency. In the storage structure 1 of the present embodiment, the modification of the storage structure 1 that is related to the installation of the gas supplying devices can be performed easily, even if no sufficient space is available outside the storage structure 1, because a worker who entered the storage structure 1 from the entrance can remove the outside surface panels 30 from the inward side.

[Other Embodiments]

(1) In the description above, an example is described in which each of the first plate-shape portion 52, the second plate-shape portion 53, and the third plate-shape portion 54 which form the pressing main body portion 51 of the inward-side pressing member 50 has the same and uniform thickness. However, the invention is not limited to such an arrangement. For example, the thickness of each plate-shape portion 52, 53, and 54 may be different from each other. In addition, the thickness of the plate-shape portions 52, 53, or 54 may vary depending on the location within each plate-shape portion 52, 53, or 54. For example, the pressing surface 53a which is generally formed in a shape of a circular-arc surface may be formed such that its thickness gradually increases toward the central portion of the circular arc.

Figure 14:
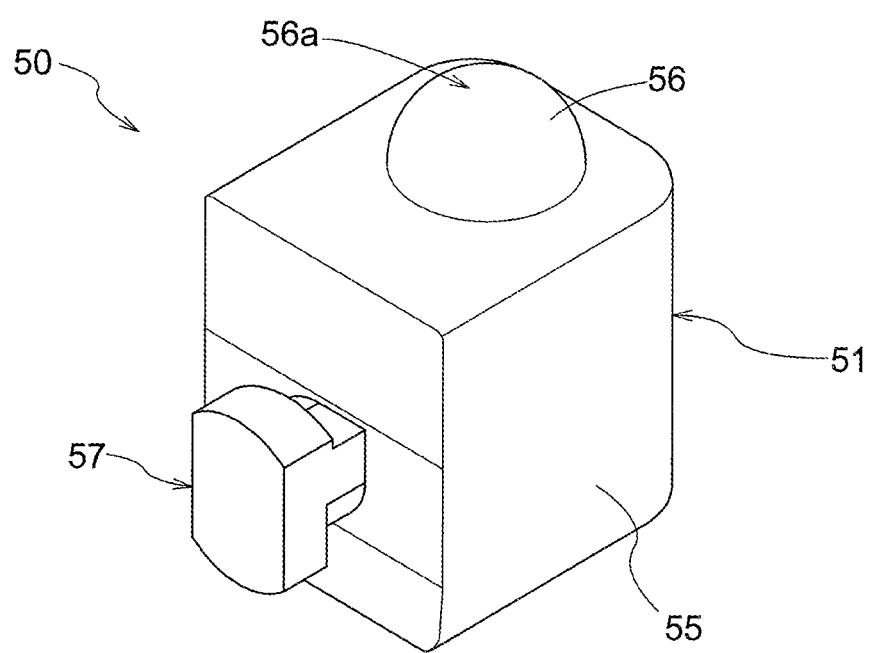
FIG. 14 is a perspective view of an inward-side pressing member in accordance with another embodiment.

(2) In the description above, an example is described in which the pressing main body portion 51 consists of three plate-shape portions 52, 53, and 54 that are integrated together such that they extend at an angle with each other. However, the invention is not limited to such an arrangement. For example, the pressing main body portion 51 may consist of only the first and second plate-shape portions 52 and 53, or may consist of four or more plate-shape portions. In addition, the pressing main body portion 51 may be generally formed in a shape of a hexahedron that has, as one of its side surfaces, a pressing surface 53a which is generally formed in a shape of a circular-arc surface. Further, as in the example shown in FIG. 14, the pressing main body portion 51 may be formed to include a hexahedron portion 55, and a solid sphere portion 56 that projects from one side surface of this hexahedron portion 55. In this case, the surface (of the solid sphere portion 56) that is generally formed in a shape of a part of a sphere serves as the pressing surface 56a that is in contact with an outside surface panel 30 with the inward-side pressing member 50 attached to a column 10. The pressing surface 56a may be formed to have a relatively large curvature. And the center of rotation Or of the rotating operation and the center of curvature Oc of the pressing surface 56a do not have to coincide with each other.

(3) In the description above, an example is described in which the insert shank 58, which forms a part of the attachment portion 57 of the inward-side pressing member 50, is formed such that its cross-section is generally formed in a shape of a partially rounded quadrilateral. However, the invention is not limited to such an arrangement. The insert shank 58 may be formed such that its cross-section is generally formed in a shape of, for example, an ellipse. Alternatively, when the insert shank 58 is not required to have a function of stopping the rotation at or near the reference phase, the insert shank 58 may be formed such that its cross-section is generally formed in a shape of, for example, a circle.

(4) In the description above, an example is described in which each end portion, along the longitudinal direction, of the retaining piece 59 has a sloped surface 59a which is a slightly sloped surface. However, the invention is not limited to such an arrangement. The surface of the retaining piece 59 that is on the pressing main body portion 51 side may be a flat surface. In this case, it may be preferable that the corner, that is on the pressing main body portion 51 side and at the forward end with respect to the direction of rotation for the attaching operation, may be cut to form a beveled edge.

(5) In the description above, an example is described in which the inward-side pressing member 50 is configured such that it can be attached to and removed from a column 10 by a worker by directly and manually rotating the inward-side pressing member 50 using his/her fingers. However, the invention is not limited to such an arrangement. For example, the inward-side pressing member 50 may be configured such that it can be attached to and removed from a column 10 by a worker by directly and manually sliding the inward-side pressing member 50 using his/her fingers. When the inward-side pressing member 50 is configured such that it is moved horizontally along the fore and aft direction D when made to slide, the pressing surface provided to the inward-side pressing member 50 may be formed to be a flat surface.

(6) In the description above, an example is described in which the inward-side pressing member 50 is configured such that it can be attached to and removed from a column 10 without having to use any tool. However, the invention is not limited to such an arrangement. The inward-side pressing member 50 may be, for example, a bracket of an L-shape which may be attached to a column 10 by means of one or more fastening members and by using a tool, such as a spanner.

(7) In the description above, an example is described in which the fixing member 44 for fixing the outward-side pressing member 40 to a column 10 is configured such that it can be attached to and removed from a column 10 without having to use any tool. However, the invention is not limited to such an arrangement. For example, the fixing member 44 may be attached to a column 10 by means of one or more fastening members and by using a tool, such as a spanner. In addition, the fixing member 44 does not necessarily have to consist of two components, and may consist of one component or three or more components.

(8) In the description above, an example is described in which two outward-side pressing members 40 are attached to each column 10. However, the invention is not limited to such an arrangement. One outward-side pressing member 40 may be attached to each column 10. In such a case, the outward-side pressing member 40 may have an attaching base portion 41, and a pair of pressing plate portions 42 with one extending in one direction along the lateral width direction W and the other extending in the opposite direction, from this attaching base portion 41.

(9) In the description above, an example is described in which each column 10 has projections 17 each of which projects along the lateral width direction W beyond the corresponding second target surface 11b. However, the invention is not limited to such an arrangement. The columns 10 do not need to have any projections 17. When the columns do not have the projections 17, the inter-column separation distance W1 is defined to be the dimension, along the lateral width direction W, of the space formed between two mutually-facing second target surfaces 11b of two mutually adjacent columns 10.

(10) The material or materials which the columns 10, the support portions 20, the outside surface panels 30, the outward-side pressing members 40, and the inward-side pressing members 50 are described to be made of, in the example described above, are merely examples. And the materials are not limited to those that are mentioned above. Each member and portion may be made of, or from, any kind of material or materials as long as the function which each has can be achieved.

(11) In the description above, a storage structure 1 that is used in conjunction with a transporting portion 8 in a storage facility 100 is described as an example. However, the invention is not limited to such an arrangement. The technology of the present embodiment is advantageously applicable also to a storage structure 1 that is used independently and without the transporting portion 8.

In addition, an arrangement described in any of the embodiments described above (including the embodiment described and the "other embodiments" above, the same is true with the statements below) may be combined with any arrangement described in any other embodiment, as long as no contradiction arises from such combination.

With regard to any arrangements, it should be understood that all embodiments disclosed in this description are merely examples in all respects and that the scope of the present invention is not limited by them. A person skilled in the art would easily understand that suitable changes and modifications may be made without departing from the spirit of the present invention. Therefore, any other embodiment with changes and modifications made without departing from the spirit of the present invention would naturally fall within the scope the present invention.

[Summary of Embodiments]

A brief summary of the storage structure described above is provided next.

In one embodiment, a storage structure for storing articles and having outer walls in side periphery thereof comprises a plurality of columns spaced apart from each other along a spaced-apart direction, an outside surface panel configured to be located between two mutually adjacent columns to form a part of an outer wall, an outward-side pressing member configured to be removably attached to a first target surface of a column, the first target surface being an outward side surface of the column, and an inward-side pressing member configured to be removably attached to a second target surface of the column, the second target surface extending at an angle with the first target surface, wherein the outside surface panel has a panel width which is less than an inter-column separation distance which is a dimension, along the spaced-apart direction, of a space formed between the two mutually adjacent columns, and wherein the outward-side pressing member and the inward-side pressing member configured to cooperate with each other to assist in holding the outside surface panel from both sides thereof.

With the arrangement described above, by removing either one or more of such outward-side pressing member or one or more of such inward-side pressing member which cooperate with each other to assist in holding the outside surface panel from both sides, the outside surface panel can be removed from either the inward side or outward side of the storage structure. Conversely, the outside surface panel can be attached from either the outward side or inward side of the storage structure by installing the outside surface panel with either the one or more of such outward-side pressing member or the one or more of such inward-side pressing member already attached to the column and by subsequently attaching the other of the one or more of such outward-side pressing member and the one or more of inward-side pressing member to the column. Therefore, when sufficient space is available outside the storage structure, the outside surface panel can be attached and removed from either the inward side or outward side of the storage structure. And even when such sufficient space is not available outside the storage structure, the outside surface panel can be attached and removed from the inward side of the storage structure. Thus, in the storage structure having this arrangement, an outside surface panel can be attached and removed regardless of the location of the storage structure.

In one embodiment, the inward-side pressing member is preferably configured to be capable of being attached to and removed from the column by a worker by directly and manually operating the inward-side pressing member using fingers.

With this arrangement, compared with a cased in which fastening members are operated using a tool etc., for example, the inward-side pressing member can be easily attached to and removed from the column by a worker by directly and manually operating the inward-side pressing member using his/her fingers. Therefore, the outside panel can be easily attached and removed from the inward side of the storage structure.

In one embodiment, the manual operation preferably involves a manual rotating operation of the inward-side pressing member along the second target surface. And the inward-side pressing member preferably has a main body portion having a pressing surface which is configured to contact the outside surface panel and which is generally formed in a shape of a part of a sphere or in a shape of a circular-arc surface.

With this arrangement, the inward-side pressing member can be easily attached to and removed from the column by a worker in one-touch operation, by directly and manually rotating the inward-side pressing member using his/her fingers. Because the inward-side pressing member contacts the outside surface panel through the pressing surface which is generally formed in a shape of a part of a sphere or in a shape of a circular-arc surface, the inward-side pressing member can be rotated smoothly with little sliding resistance, compared with a case in which the pressing surface is formed in a shape of a flat surface, for example. Therefore, the outside panel can be attached and removed from the inward side of the storage structure with greater ease.

In one embodiment, the inward-side pressing member is preferably formed such that the pressing surface has a constant curvature and such that a center of rotation of the rotating operation of the inward-side pressing member coincides with a center of the curvature of the pressing surface.

With this arrangement, the enveloping surface traced out by the pressing surface as the inward-side pressing member is rotated coincides with the pressing surface. Therefore, even when the phase angle of the inward-side pressing member is somewhat different from the reference phase which is defined in advance as the phase angle for holding the outside surface panel between the inward-side pressing ember and an outward-side pressing member, the pressing surface can be reliably in contact with the outside surface panel.

In one embodiment, the inward-side pressing member preferably has a main body portion having a pressing surface which is configured to contact the outside surface panel, wherein the pressing main body portion is preferably formed of resin, and has a plurality of plate-shape portions integrated together so as to extend at an angle with each other.

This arrangement adds a certain amount of strength to the pressing main body portion which is an important part of the inward-side pressing portion, and also makes it possible to manufacture the main body portion with a relatively small amount of material, which helps in reducing cost. And because the inward-side pressing member has a structure of a plurality of plate-shape portions integrated together, it is less likely for shrink marks to occur even when manufacturing the pressing main body portion made of resin by, for example, injection molding; thus, the inward-side pressing member can be manufactured with greater accuracy in its dimensions.

What is claimed is:

1. A storage structure for storing articles and having outer walls in side periphery thereof comprising:
   a plurality of columns spaced apart from each other along a spaced-apart direction;
   an outside surface panel configured to be located between two mutually adjacent columns to form a part of an outer wall;
   an outward-side pressing member configured to be removably attached to a first target surface of a column, the first target surface being an outward side surface of the column; and
   an inward-side pressing member configured to be removably attached to a second target surface of the column, the second target surface extending at an angle with the first target surface;
   wherein the outside surface panel has a panel width which is less than an inter-column separation distance which is a dimension, along the spaced-apart direction, of a space formed between the two mutually adjacent columns,
   wherein the outward-side pressing member and the inward-side pressing member are configured to cooperate with each other to apply pressure to the outside surface panel from a front side and a back side of the outside surface panel,
   wherein the inward-side pressing member is configured to be capable of being attached to and removed from the column by a worker by directly and manually operating the inward-side pressing member using fingers,
   wherein the inward-side pressing member is configured to rotate about its own axis while attached to the second target surface, and
   wherein the inward-side pressing member has a main body portion having a pressing surface which is configured to contact the outside surface panel and which is generally formed in a shape of a part of a sphere or in a shape of a circular-arc surface.

2. The storage facility as defined in claim 1, wherein the inward-side pressing member is formed such that the pressing surface has a constant curvature and such that a center of rotation of the rotating operation of the inward-side pressing member coincides with a center of the curvature of the pressing surface.

3. The storage facility as defined in claim 1 wherein the main body portion is formed of resin, and has a plurality of plate-shaped portions integrated together so as to extend at an angle with each other.

* * * * *